US012731101B2

(12) United States Patent
Ni et al.

(10) Patent No.: US 12,731,101 B2
(45) Date of Patent: Sep. 8, 2026

(54) LOAD SELECTION FOR A MULTI-MODAL TRANSPORTATION NETWORK WITH FACILITY CAPACITY CONSTRAINTS

(71) Applicant: Walmart Apollo, LLC, Bentonville, AR (US)

(72) Inventors: Ming Ni, Pflugerville, TX (US); Liqing Zhang, Humble, TX (US); Kunlei Lian, Windermere, FL (US); Nadere Mansouri, McKinney, TX (US); Etika Agarwal, Bangalore (IN); Rohan Prakash, Rogers, AR (US); Li Ji, Fremont, CA (US); Ti Zhang, Rocklin, CA (US); Jing Huang, San Jose, CA (US); Mingang Fu, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/042,558

(22) Filed: Jan. 31, 2025

(65) Prior Publication Data

US 2025/0245616 A1 Jul. 31, 2025

Related U.S. Application Data

(60) Provisional application No. 63/627,688, filed on Jan. 31, 2024.

(51) Int. Cl.
*G06Q 10/083* (2024.01)

(52) U.S. Cl.
CPC .............................. *G06Q 10/08355* (2013.01)

(58) Field of Classification Search
CPC ................................................ G06Q 10/08355
See application file for complete search history.

(56) References Cited

U.S. PATENT DOCUMENTS

2006/0224423 A1 10/2006 Sun et al.
2015/0081360 A1* 3/2015 Sun ........................ G06Q 10/08 705/7.13

(Continued)

FOREIGN PATENT DOCUMENTS

CN 114580687 A 6/2022

OTHER PUBLICATIONS

Gilbert Laporte, Shared mobility systems: an updated survey, p. 105-106, 2018 (Year: 2018).*

(Continued)

*Primary Examiner* — Ibrahim N El-Bathy
(74) *Attorney, Agent, or Firm* — FOLEY & LARDNER LLP

(57) ABSTRACT

A system including a processor and a non-transitory computer-readable media storing computing instructions that, when executed on the processor, cause the processor to perform certain operations: splitting a set of candidate loads into subsets of candidate loads, wherein time windows of the subsets of candidate loads align with time ranges of a facility; iteratively reducing, without integer constraints, the subsets of candidate loads into a number of candidate loads; determining multiple candidate loads from the number of candidate loads that optimize an objective function with the integer constraints; and selecting at least one candidate load from the multiple candidate loads corresponding to a mode of transportation. Other embodiments are described.

20 Claims, 9 Drawing Sheets

(56) References Cited

U.S. PATENT DOCUMENTS

| | | | | |
|---|---|---|---|---|
| 2020/0294172 | A1* | 9/2020 | Ebener, Jr. | G06Q 10/06312 |
| 2022/0004985 | A1* | 1/2022 | Neumann | G06Q 10/047 |
| 2022/0076333 | A1* | 3/2022 | Thornberg | G06Q 40/06 |
| 2023/0088950 | A1 | 3/2023 | Tadeu de Paula et al. | |
| 2023/0245047 | A1 | 8/2023 | Lian et al. | |

OTHER PUBLICATIONS

OptimoRoute, "Load Planning: How Load Planers Can Use Route Optimization to Reduce Transportation Costs," Retrieved from https://optimoroute.com/load-planning on Dec. 28, 2023 Jun. 3, 2020.

* cited by examiner

Network Adapter
220
Memory ROM/RAM
208
Hard Drive
114
CD-Rom Drive
116
Universal Serial Bus
112
Disk Controller
204
Graphics Adapter
224
214
System Bus
Video Controller
202
CPU
210
Keyboard Adapter
226
Mouse Adapter
206
Other I/O Devices
222
Monitor
106
Keyboard
104
Mouse
110

| Time Range | CP Capacity* | Load Pickup Window | Transit Time Between Origin and CP | Load candidate Pickup Windows after Alignment |
|---|---|---|---|---|
| [12/11/2023 0, 12/11/2023 17] | 1000 | [12/1/2023 0 , 12/3/2023 15] | 10 D | [12/1/2023 0, 12/1/2023 17] |
| [12/12/2023 0, 12/12/2023 23] | 2000 | | | [12/2/2023 0, 12/2/2023 23] |
| [12/13/2023 0, 12/13/2023 17] | 1000 | | | [12/3/2023 0, 12/3/2023 17] |

<u>Decision Variables:</u>

- $x_l$: a binary variable equals 1 if load $l$ is selected
- $y_{lt}$: a binary variable equals 1 if load $l$ is determined to arrive on period $t$
- $z_o$: a binary variable equals 1 if the shipment $o$ is covered by a load

FIG. 7

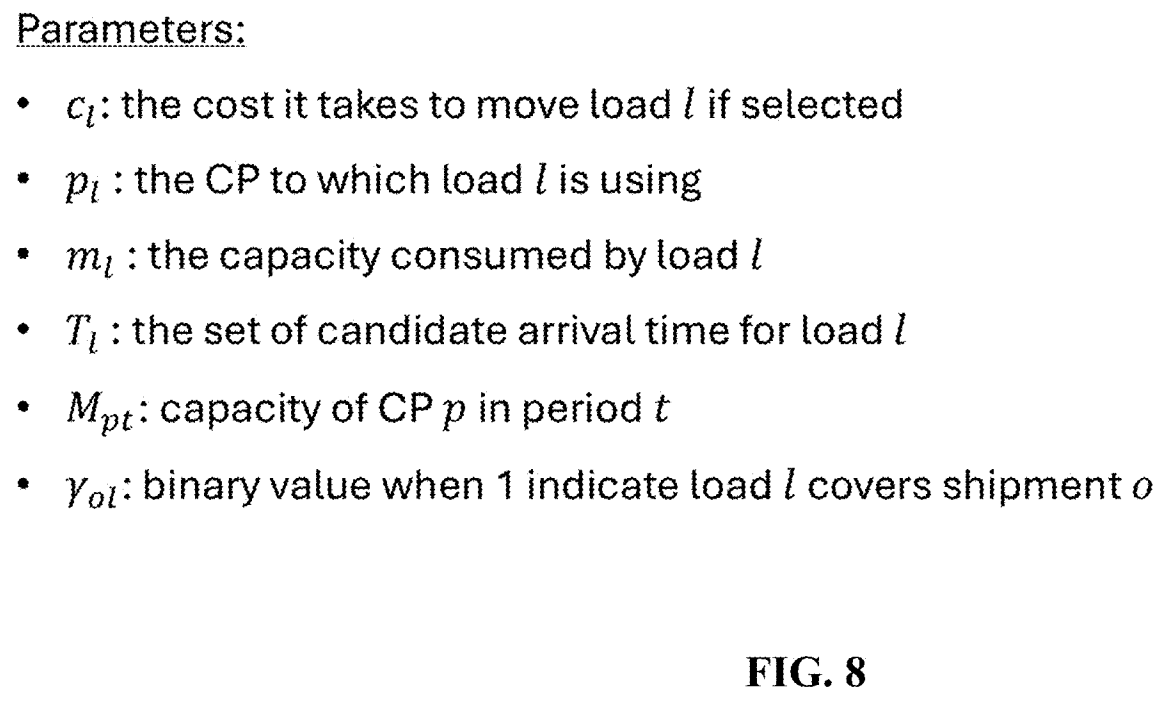

Parameters:

- $c_l$: the cost it takes to move load $l$ if selected
- $p_l$ : the CP to which load $l$ is using
- $m_l$ : the capacity consumed by load $l$
- $T_l$ : the set of candidate arrival time for load $l$
- $M_{pt}$: capacity of CP $p$ in period $t$
- $\gamma_{ol}$: binary value when 1 indicate load $l$ covers shipment $o$

FIG. 8

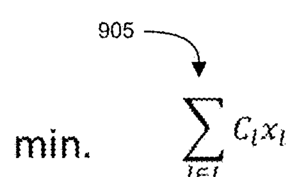

905 — min. $\sum_{l \in L} C_l x_l$

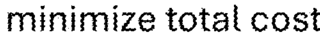

minimize total cost

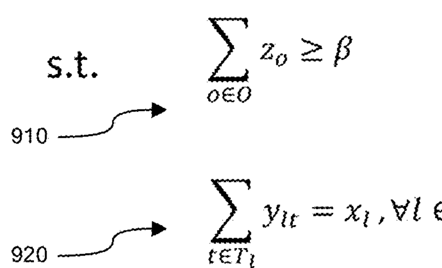

910 — s.t. $\sum_{o \in O} z_o \geq \beta$ — at least β number of shipments are covered by the selected loads 920 — $\sum_{t \in T_l} y_{lt} = x_l, \forall l \in L$ — an arrival date must be selected if a load is chosen

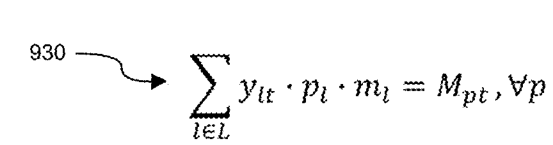

930 — $\sum_{l \in L} y_{lt} \cdot p_l \cdot m_l = M_{pt}, \forall p \in P, t \in T$ — the center point capacity on any day is not violated

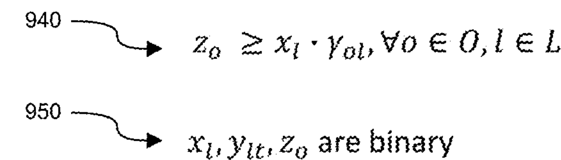

940 — $z_o \geq x_l \cdot \gamma_{ol}, \forall o \in O, l \in L$ — derives the value of $z_o$ to determine whether a shipment is covered 950 — $x_l, y_{lt}, z_o$ are binary

FIG. 9

LOAD SELECTION FOR A MULTI-MODAL TRANSPORTATION NETWORK WITH FACILITY CAPACITY CONSTRAINTS

CROSS-REFERENCE TO RELATED APPLICATION

This application claims the benefit of U.S. Provisional Application No. 63/627,688, filed Jan. 31, 2024, which is incorporated herein by reference in its entirety.

TECHNICAL FIELD

This disclosure relates generally to load selection for a multi-modal transportation network with facility capacity constraints.

BACKGROUND

An inbound transportation network can include various facilities, such as vendors, distribution centers, center points, etc. The configuration of loads that are shipped within the transportation network, and the routes used for such loads, can affect the overall efficiency and costs of the inbound transportation network.

BRIEF DESCRIPTION OF THE DRAWINGS

To facilitate further description of the embodiments, the following drawings are provided in which:

FIG. 7 shows decision variables and definition for variables for a mixed integer programing model;

FIG. 8 also shows the input parameters used for the mixed integer programming model; and FIG. 9 shows an objective function and constraints for the mixed integer programming model.

DETAILED DESCRIPTION

Figure 1:
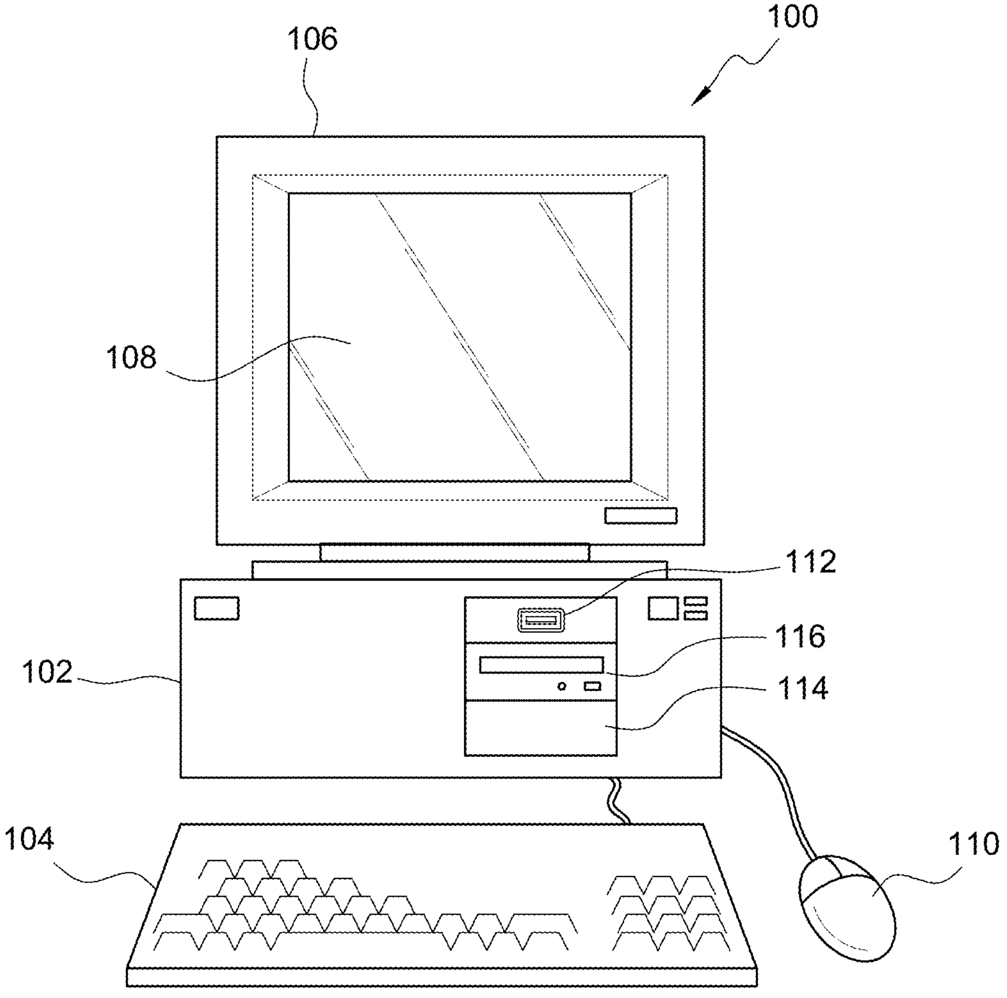
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Figure 2:
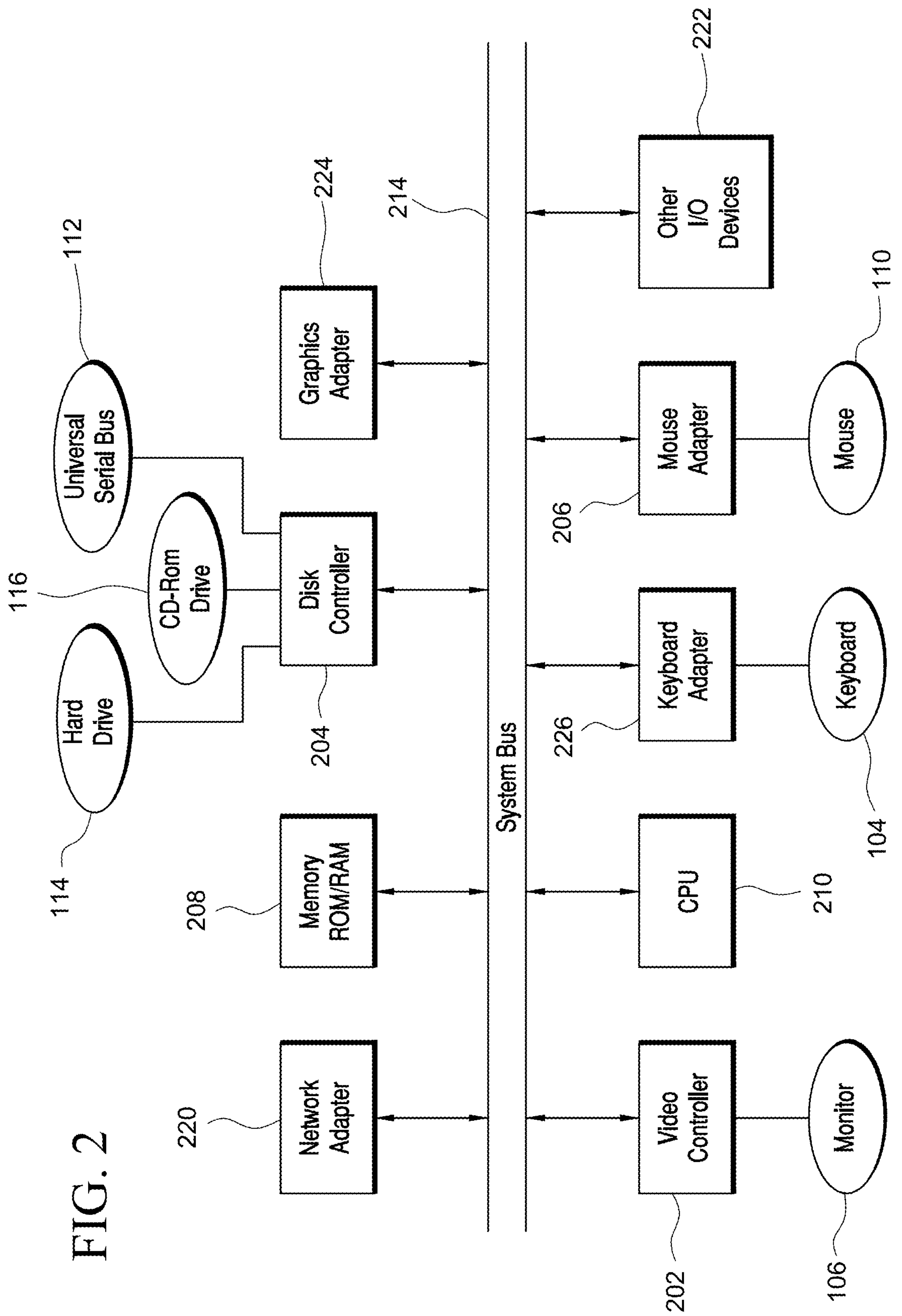
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, “processor” and/or “processing module” means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
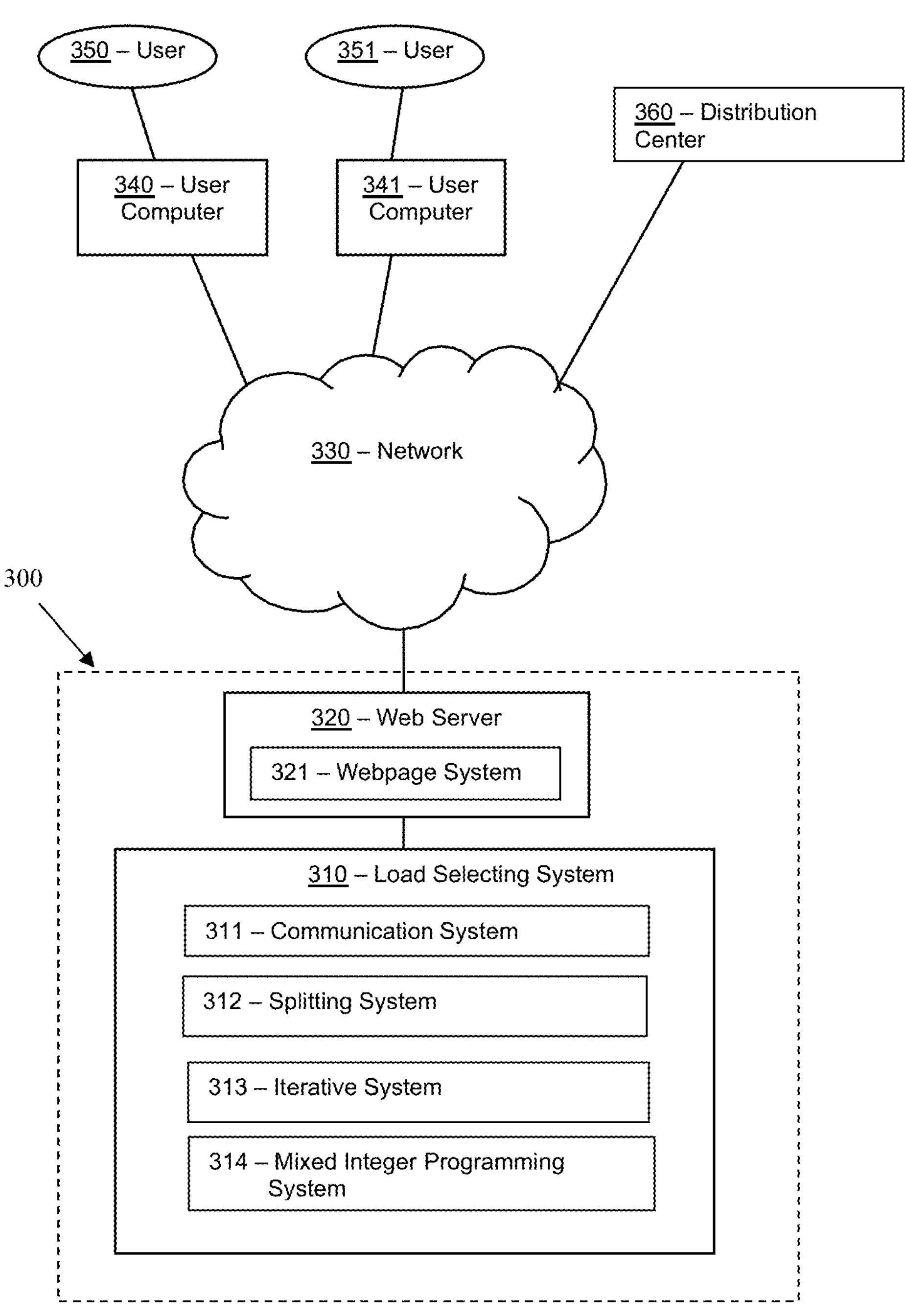
FIG. 3 illustrates a block diagram of a system for performing load selection for a multi-modal transportation network with facility capacity constraints.

Turning ahead in the drawings, FIG. 3 illustrates a block diagram of a system 300 for performing load selection for a multi-modal transportation network with facility capacity constraints. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a load selecting system 310 and/or a web server 320. Load selecting system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, load selecting system 310 and/or web server 320. Additional details regarding load selecting system 310 and/or web server 320 are described herein.

In a number of embodiments, each system of load selecting system 310 and/or web server 320 can be a special-purpose computer programed specifically to perform specific functions not associated with a general-purpose computer, as described in greater detail below.

In some embodiments, web server 320 can be in data communication through a network 330 with one or more user computers, such as user computers 340 and/or 341. Network 330 can be a public network, a private network, or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to interface with load selecting system 310, such as to generate transportation schedules for a freight transportation network, in addition to other suitable activities.

In some embodiments, an internal network that is not open to the public can be used for communications between load selecting system 310 and/or web server 320 within system 300. Accordingly, in some embodiments, load selecting system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, system 300 can be a distributed system that includes one or more systems in each of the distribution centers (e.g., 360). In several embodiments, distribution centers can include central point centers (CP), and/or another suitable facility. In other embodiments, system 300 can be a centralized system that communicates with computer systems in the distribution centers (e.g., 360). In some embodiments, network 330 can be an internal network that is not open to the public, which can be used for communications between system 300, and distribution centers (e.g., 360). In other embodiments, network 330 can be a public network, such as the Internet. In several embodiments, operators and/or administrators of system 300 can manage system 300, the processor(s) of system 300, and/or the memory storage unit(s) of system 300 using the input device(s) and/or display device(s) of system 300, or portions thereof in each case.

In several embodiments, system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300. In a similar manner, the processors and/or the non-transitory computer-readable media can be local and/or remote to each other.

Meanwhile, in many embodiments, system 300 also can be configured to communicate with and/or include one or more databases. The one or more databases can include a database that contains information about pick-up time windows, delivery time-windows, facility constraints, and/or another suitable data point, for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, network 330, distribution center 360, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, load selecting system 310 can include a communication system 311, a splitting system 312, an iterative system 313, and/or a mixed integer programming system 314. In many embodiments, the systems of load selecting system 310 can be modules of computing instructions (e.g., software modules) stored at non-transitory computer readable media that operate on one or more processors. In other embodiments, the systems of load selecting system 310 can be implemented in hardware. Load selecting system 310 can be a computer system, such as computer system 100 (FIG. 1), as described above, and can be a single computer, a single server, or a cluster or collection of computers or servers, or a cloud of computers or servers. In another embodiment, a single computer system can host load selecting system 310. Additional details regarding load selecting system 310 and the components thereof are described herein.

Figure 4:
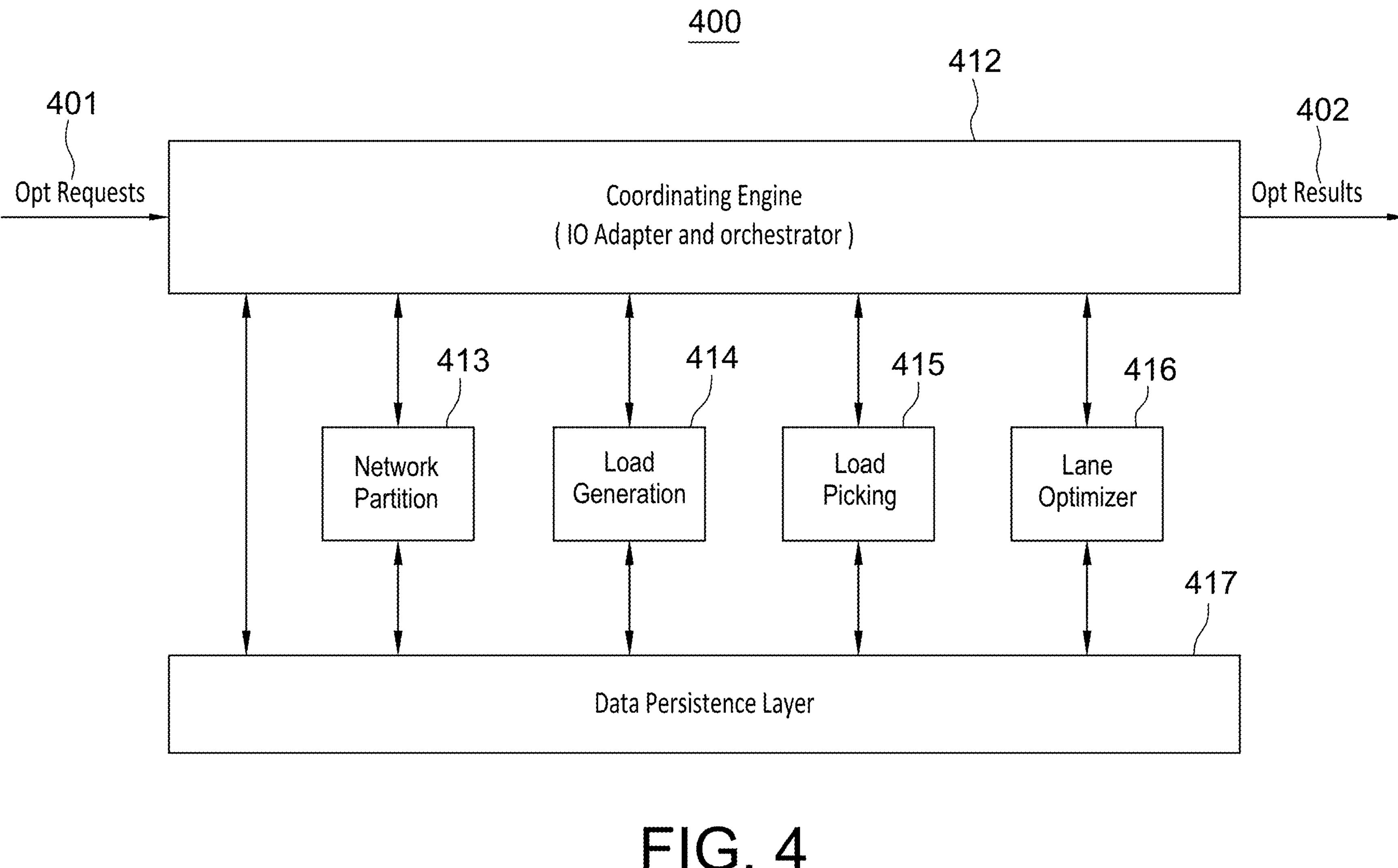
FIG. 4 illustrates a flow chart for processing optimization request through a central coordinating engine.

Turning ahead in the drawings, FIG. 4 illustrates a block diagram of an architecture 400 of engines 412-416 and data persistence layer 417 for load selecting system 310 (FIG. 3). Architecture 400 is merely exemplary, and embodiments of load selecting system 310 (FIG. 3) are not limited to architecture 400 presented herein.

As shown in FIG. 4, a central coordinating engine, such as coordinating engine 412, can be an input/output (IO) adapter and orchestrator among the functional engines (e.g., engines 412-416), so that the functional engines can be triggered to process subproblems of an optimization problem for selecting candidate loads. Each functional engine can be triggered a single time or multiple times, and/or can run multiple instances in parallel to solve respective subproblems of the optimization problem directly. In several embodiments, engines 412-416 can interface with data persistence layer 417 to access and/or store data. In many embodiments, data can be stored in data persistence layer 417 between engines. In many embodiments, architecture 400 can make use of cloud computing a parallel processing.

In several embodiments, coordinating engine 412 can receive inputs (e.g., optimization requests 401), output optimization results 402 (e.g., outputs), and/or orchestrate the overall optimization process. In a number of embodiments, coordinating engine 412 can keep track of engine status, such as ready, busy, complete, or failed, of the engines. In other embodiments, communication system 311 (FIG. 3) can be used for IO with load selection system 310 (FIG. 3).

In several embodiments, network partition engine 413 can divide the inbound network (e.g., 500 (FIG. 5)) into several smaller subnetworks to be solved independently by load generation engine 414. In many embodiments, the partitioning scheme used by network partition engine 413 can be data driven.

In several embodiments, load generation engine 414 can generate candidate loads, such as feasible loads and/or loads that meet a threshold level of quality for the subnetworks. For example, shipments can be consolidated as candidate loads. In many embodiments, coordinating engine 412 can trigger multiple instances of load generation engine 414, and each instance of load generation engine 414 can solve a different subnetwork, as generated by network partition engine 413. The number of instances of load generation engine 414 can be scaled on-demand to the number of subnetworks. These instances of the load generation engine 414 can be implemented by distributed process, such as parallel processing across parallel processors.

Figure 5:
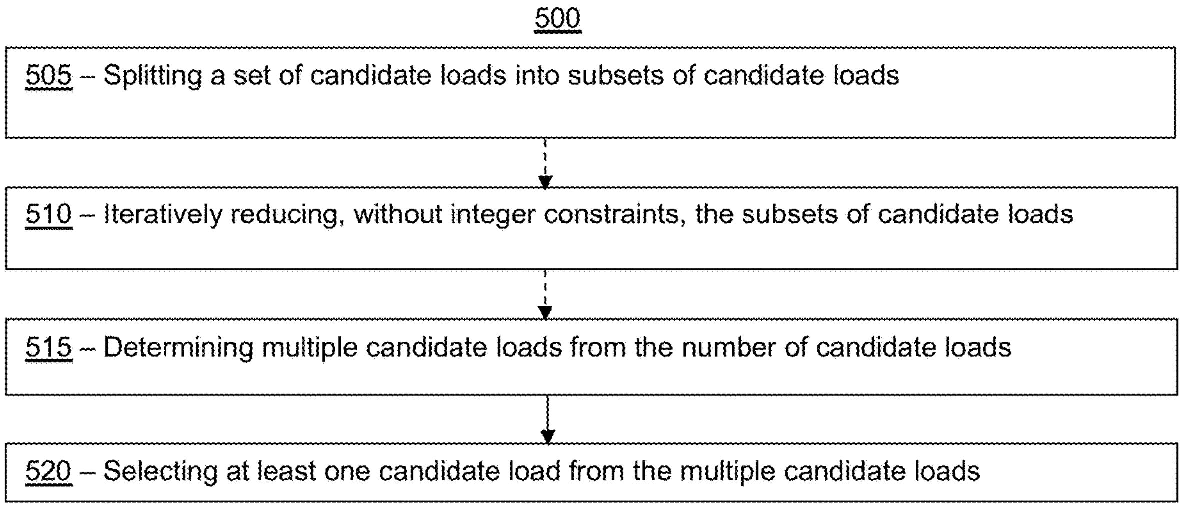
FIG. 5 illustrates a flow chart for a method of performing load selection for a multi-modal transportation network with facility capacity constraints, according to an embodiment.

In several embodiments, load picking engine 415 can select the final set of loads to be used from among the combined pool of candidate loads generated from the multiple instances of load generation engine 414. For example, loads can be consolidated across the entire network, and loads can be selected to minimize overall transportation costs. In a number of embodiments, load picking engine 415 can select the final set of loads as shown in method 500 (FIG. 5, described below).

In several embodiments, lane optimizer engine 416 can evaluate alternative carriers applicable to each load selected by load picking engine 415, and select the most suitable carrier based on business lane constraints for each load.

In many embodiments, data persistence layer 417 can facilitate data sharing to limit data requests between engines and/or limit duplicated requests. In many embodiments, engines can be scaled horizontally for parallel computing, as needed, including across the different types of engines. In many embodiments, the status of an engine can be saved, and the status can be rehydrated, such as copying the same steps from the previous run, such that rerunning of steps can be limited to fails, changes, or updates.

In many embodiments, architecture 400 can solve large-scale optimization problems, and can support solving such optimization problems on the largest transportation networks in the world. In many embodiments, architecture can be implemented with cloud computing, which can leverage automated cloud deployment solutions, such as Kubernetes (which was originally authored by Google, and is now provided by the Cloud Native Computing Foundation), to scale demand. The cloud infrastructure can be utilized to accelerate problem solving in the form of parallel computing.

Many conventional freight planning systems struggle to scale. For example, in some conventional systems, load templates are created, and shipments are assigned to the load templates. The load template creation often limits the possible choices. As another example, in some conventional systems, a strategy is generated to sequence different consolidation behaviors, and shipments are filtered with preconfigured characteristics for each consolidation behavior, which is then collected and compared, which involves extensive user involvement to monitor and handle new or changing scenarios and to add consolidation behavior accordingly to reflect the changed scenario. Both issues involve running steps sequentially, which limits its ability to be deployed in, and take advantage of, a parallel computing or distributed cloud environment.

In many embodiments, the techniques described herein can provide a modularized algorithm scheme to enable combination and reuse of algorithms, which also can be customized for different business units. For example, each of the functional engines (e.g., 412-416) of load selecting system 310 can use a modularized algorithm scheme to combine and reuse algorithmic solvers. In many embodiments, the algorithmic solvers can be scaled vertically and/or horizontally.

Turning ahead in the drawings, FIG. 5 illustrates a flow chart for a method 500, according to another embodiment. In several embodiments, method 500 can be a method of performing load selection for a multi-modal transportation network with facility capacity constraints, according to an embodiment. In some embodiments, method 500 can be a method of determining, using computational programming, a compacted load consolidation plan for corresponding modes of transportation. Method 500 further can illustrate how a load generated by a load generation model can be re-distributed and consolidated into other candidate loads to determine alternate pickup and/or delivery windows. In several embodiments, method 500 also can include re-distributing loads from a set of loads generated by a load generation model without violating facility constraints. Method 500 further can include consolidating loads of a candidate load to increase carrier capacity and minimize transportation costs. Method 500 is merely exemplary and is not limited to the embodiments presented herein. Method 500 can be employed in many different embodiments and/or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as load selecting system 310 and/or web server 320. The processor(s) can be similar or identical to the processor(s) described above with respect to computer system 100 (FIG. 1).

Turning ahead in the drawings in FIG. 5, method 500 can include an activity 505 of splitting a set of candidate loads into subsets of candidate loads. In various embodiments, splitting the set of candidate loads can generate a volume of loads of scale that can amount to approximately 1 million loads, 2 million loads, 10 million loads, and another suitable number of loads.

In several embodiments, activity 505 of splitting a set of candidate loads can include time windows of the subsets of candidate loads that align with time ranges of a facility. In various embodiments, facility capacity can be aggregated by time ranges.

Figure 6:
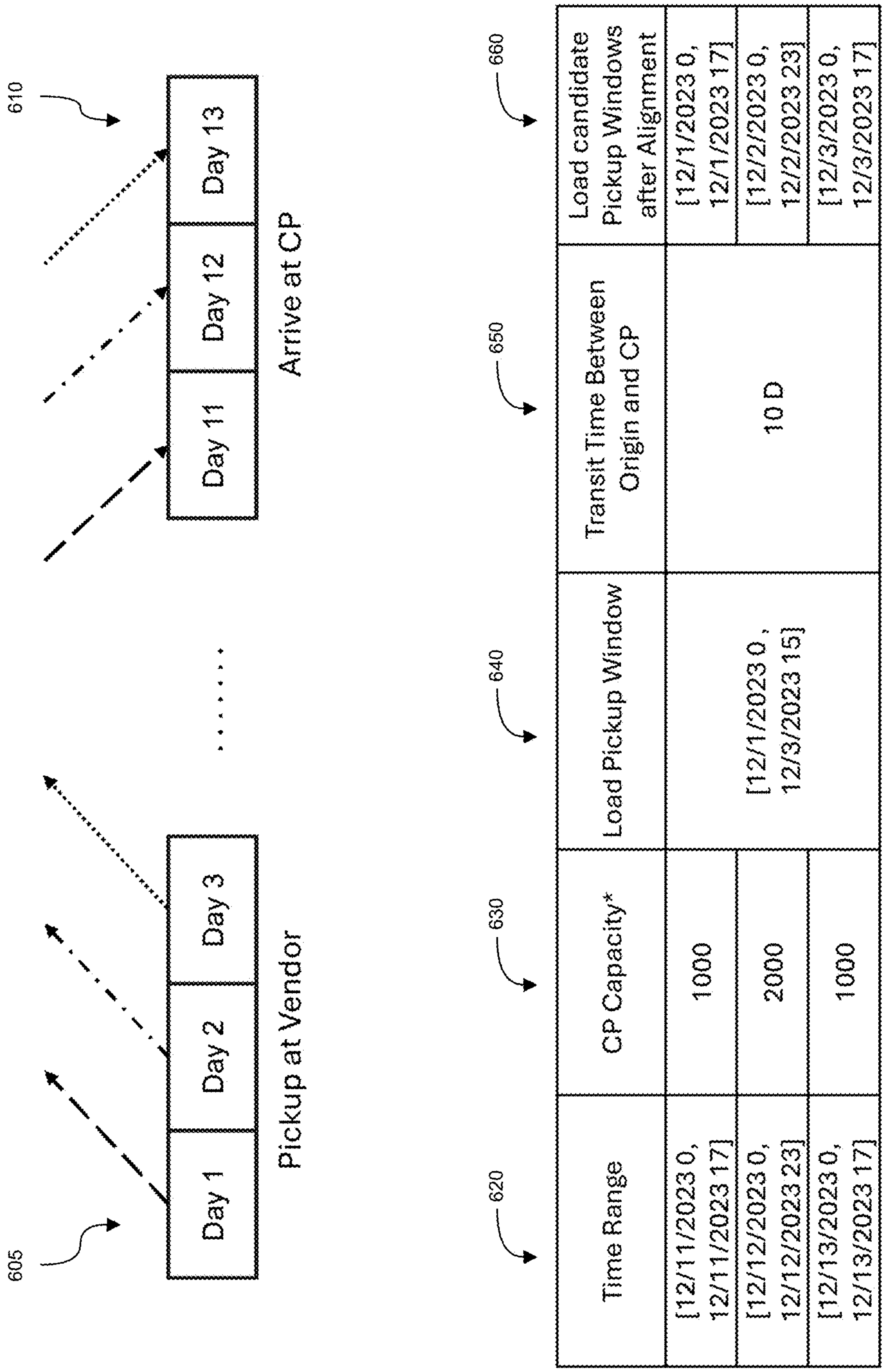
FIG. 6 illustrates examples of aligning time windows of candidate loads with time windows of the daily capacity of a facility and a table of available facility time ranges, capacity limits, load pickup window, transit time, and load candidate pickup windows after alignment.

In some embodiments, splitting the set of candidate loads is based on facility capacity limits for the time ranges of the facility. In various embodiments, activity 505 can include obtaining daily time ranges of facility availability based on (i) a physical capacity of a facility with room to accept sizes and/or volumes of loads during a time period and/or (ii) a load processing capacity also based on a size and/or volume of shipments while at a facility during the time period. In several embodiments, facility capacity time constraints are limited each day as a facility has a capacity limit during the hours of operation for each day. In various embodiments, aligning the pickup time windows with the time ranges of the facility expands the pickup time windows outputting multiple pickup/delivery day options where each additional pickup time window has one pickup/delivery option over the time period for transporting the shipments to the facility location. In some embodiments, FIG. 6 illustrates examples of aligning time windows of candidate loads with time windows of the daily capacity of a facility. In some embodiments, FIG. 6 includes time windows 605 of exemplary pickup opportunities for carriers to obtain multiple shipments (e.g., orders) at a vendor location and/or another suitable third-party location over 3 days (e.g., day 1, day 2, or day 3). In several embodiments, FIG. 6 also includes time windows 610 of exemplary available arrival opportunities for carriers to ship the multiple shipments to a facility location (e.g., CP location) over 3 days (e.g., day 11, day 12, or day 13). As an example, if a carrier obtains a shipment from a vendor location on day 1, it is anticipated that the shipment can arrive on day 11 at the facility location, similarly a pickup on day 2 arrives on day 12 and a pickup on day 3 arrives on day 13, for an average transit time of 10 days from pickup to delivery at the facility.

In various embodiments, FIG. 6 further illustrates advantages of obtaining load candidate pickup windows after alignment with daily facility capacity ranges of times. As shown in FIG. 6, time range 620 includes available facility time ranges over a 3-day period (e.g., day 11, day 12, and day 13) with corresponding facility capacity limits 630 of 1,000 for day 11, 2,000 for day 12, and 1,000 for day 13 of arrival dates/times. In this example, a load pickup window 640 shows a pickup time window for day 1 and no pickup time windows for day 2 or day 3. Further in this example, the transit time 650 between the origin (e.g., pickup time) and the arrival at the facility time is estimated to take 10 days. After aligning the pickup time windows with the facility time ranges, the available pickup time windows 660 as generated expands to multiple options over the 3-day pickup time windows including opportunities for all 3 days versus 1 day out of the 3-day period.

Returning to the FIG. 5, method 500 also can include an activity 510 of iteratively reducing, without integer constraints, the subsets of candidate loads into a number of candidate loads.

In some embodiments, activity 510 of iteratively reducing the subsets of candidate loads additionally can include determining, using column generation, the number of candidate loads that meet first time range criteria. An advantage of using column generation can include leveraging improvement with each iteration by starting with a manageable size of subset loads and taking repeated steps to select smaller loads due to the scale of the subset of loads, post splitting the set of candidate loads. As an example, after receiving 20 k orders load generation engine 414 can generate approximately 800 k candidate loads from the 20 k orders. After splitting a set of candidate loads for facility capacity consideration, the candidate load count can increase further to approximately 2 million candidate loads or more. Such a scale of candidate loads can be a technological burden for the load generation engine 414 (e.g., optimizer) to process due to the scale, computer memory limitations, and processing limitations. In various embodiments, an advantage of utilizing a column generation based algorithm, can include reducing the candidate load pool size to manageable subsets of 50$k$ candidate loads and also retain the most optimal candidate loads of the approximately 2 million candidate loads.

In several embodiments, the first time range criteria can include multiple pickup or delivery day options.

In a number of embodiments, method 500 further can include an activity 515 of determining multiple candidate loads from the number of candidate loads that optimize an objective function with the integer constraints. In several embodiments, the multiple candidate loads can computing include instructions (i) specifying multiple iterations of shipment consolidation configurations and/or (ii) multiple variations of pickup/delivery windows.

In various embodiments, an output of activity 515 also can include computing instructions to consolidate shipments of portions of the multiple candidate loads. In several embodiments, the computing instructions further can output shipment consolidation configurations and/or different grouping results of a number of shipments previously grouped together. As an example, consolidation configures for 4 shipments can include consolidating [shipments 1, 2], [shipments 3, 4], [shipments 1, 3, 4], [shipments 2, 3] . . . , etc. However, candidate shipment consolidations can conflict with each other as some shipments cannot be selected in more than one grouping. For example, grouping [shipments 1, 2] and grouping [shipments 2, 3] both contain shipment 2 in each of groupings, thus a conflict exists. In such an example, activity 515 determines a final solution of which of the two shipments can be put together in one grouping so that each shipment appears in exactly one grouping.

Returning to FIG. 5, activity 515 of determining the multiple candidate loads also can include determining, using a mixed integer programming model, the multiple candidate loads based on second time range criteria. In various embodiments, activity 515 can include formulating the mixed integer programming model to select loads to cover all shipments with objectives of (i) minimizing a total transportation costs where all shipments are covered once, (ii) fully utilizing facility capacity limits, (iii) providing a compacted consolidation load plan to be utilized in a downline lane optimizer engine 416 (FIG. 4).

In various embodiments, a compacted consolidation load plan can be a load plan with multiple routable shipments included in the list of loads of the output (e.g., solution). In some embodiments, each shipment is included in one load. When a load plan is transmitted downline to lane optimizer engine 416, lane optimizer engine 416 can check applicable carriers for each load of shipments and select a best fit carrier based on carrier selection constraints.

The decision variables can include at least one of (i) when a candidate load is selected, (ii) when the candidate load is determined to arrive during a time period, or (iii) when a shipment is covered by the candidate load. In several embodiments, the input parameters can include (i) a facility capacity during a time period of each day, (ii) a volume capacity of the facility capacity consumed by the multiple candidate loads, or (iii) a set of candidate load arrival times of the multiple candidate loads at the facility.

In several embodiments, the second time range criteria comprises a first time window for each candidate load aligning with a second time window of available capacity of the facility.

Turning ahead in the drawings, as FIG. 9 shows objective function 905 of minimizing the total cost of transportation and multiple constants with the integer constraints added back. FIG. 9 also shows the multiple constants that can include a constraint 910 of at least a B number of shipments can be covered by the multiple candidate loads, a constraint 920 of selecting an arrival date/time when a candidate load is selected, a constraint 930 of using the facility capacity (CP) without violating the capacity limits, a constraint 940 of deriving a value of a shipment to determine whether that shipment is covered, and/or a constraint 950 where the decision variables are binary.

In many embodiments, the mixed integer programing model is formulated to add the integer constraints back to the multiple candidate loads based on decision variables and input parameters. FIG. 7 shows the decision variables and definition for variables x, y, and z, where i refers to an index, I refers to a load, t refers to a time period, and o refers to a shipment. FIG. 8 also shows the input parameters used for the mixed integer programming model, where p refers to an index.

In various embodiments, method 500 additionally can include an activity 520 of selecting at least one candidate load from the multiple candidate loads corresponding to a mode of transportation. In several embodiments, modes of transportation can include types of carriers suited for multiple load types such as (i) parcel (e.g., small packages), LTL loads indicating a carrier fill rate is less than a full truck load, TL loads indicating the carrier fill rate is full, RL carriers indicating transportation modes by Rail, and another suitable carrier options. As an example, each transportation mode can have associated carriers where for the same group of shipments, it is possible that multiple transportation modes are all feasible to transport the loads at the expense of different transportation costs corresponding to different transit times. An advantage of using lane optimizer engine 416 can be to select each optimal carrier for each load (e.g., group of shipments) so that the service level is protected and the total cost is minimized.

Returning to FIG. 3, communication system 311 can at least partially perform activity 505 of splitting a set of candidate loads can include time windows of the subsets of candidate loads that align with time ranges of a facility.

In many embodiments, splitting system 312 can at least partially perform activity 505 of splitting a set of candidate loads into subsets of candidate loads.

In some embodiments, iterative system 313 can at least partially perform activity 510 of iteratively reducing, without integer constraints, the subsets of candidate loads into a number of candidate loads.

In a number of embodiments, mixed integer programming system 314 can at least partially perform activity 515 of determining multiple candidate loads from the number of candidate loads that optimize an objective function with the integer constraints.

In several embodiments, web server 320 can include a webpage system 321. Webpage system 321 can at least partially perform sending instructions to user computers (e.g., 350-351 (FIG. 3)) based on information received from communication system 311.

In many embodiments, the techniques described herein can be used continuously at a scale that cannot be handled using manual techniques.

Various embodiments can include a system including a processor and a non-transitory computer-readable media storing computing instructions that, when executed on the processor, cause the processor to perform certain operations. The operations can include splitting a set of candidate loads into subsets of candidate loads. The time windows of the subsets of candidate loads can align with time ranges of a facility. The operations also can include iteratively reducing, without integer constraints, the subsets of candidate loads into a number of candidate loads. The operations further can include determining multiple candidate loads from the number of candidate loads that optimize an objective function with the integer constraints. The operations additionally can include selecting at least one candidate load from the multiple candidate loads corresponding to a mode of transportation.

A number of embodiments can include a computer-implemented method. The method can include receiving, splitting a set of candidate loads into subsets of candidate loads. The time windows of the subsets of candidate loads can align with time ranges of a facility. The method also can include iteratively reducing, without integer constraints, the subsets of candidate loads into a number of candidate loads. The method further can include determining multiple candidate loads from the number of candidate loads that optimize an objective function with the integer constraints. The method additionally can include selecting at least one candidate load from the multiple candidate loads corresponding to a mode of transportation.

Additional embodiments can include a non-transitory computer-readable media storing computing instructions that, when executed on a processor, cause the processor to perform certain operations. The operations can include splitting a set of candidate loads into subsets of candidate loads. The time windows of the subsets of candidate loads can align with time ranges of a facility. The operations also can include iteratively reducing, without integer constraints, the subsets of candidate loads into a number of candidate loads. The operations further can include determining multiple candidate loads from the number of candidate loads that optimize an objective function with the integer constraints. The operations additionally can include selecting at least one candidate load from the multiple candidate loads corresponding to a mode of transportation.

Although performing load selection for a multi-modal transportation network with facility capacity constraints has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIG. 5 may include different procedures, processes, and/or activities and be performed by many different modules, in many different orders. As another example, performing a communication system 311, a splitting system 312, an iterative system 313, and/or a mixed integer programming system 314. Additional details regarding a communication system 311, a splitting system 312, an iterative system 313, and/or a mixed integer programming system 314 (FIGS. 3-5) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising a processor and a non-transitory computer-readable medium storing computing instructions that, when executed on the processor, cause the processor to perform operations comprising:

generating, using a partition engine, a plurality of subnetworks by partitioning an inbound network into the plurality of subnetworks;

triggering, using a coordinating engine, multiple instances, of a load generation engine, that are implemented across parallel processors based on a number of the plurality of subnetworks generated using the partition engine;

generating, using a first instance of the multiple instances of the load generation engine, first candidate loads for a first subnetwork of the plurality of subnetworks generated using the partition engine;

generating, using a second instance of the multiple instances of the load generation engine and in parallel with generating the first candidate loads using the first instance of the multiple instances of the load generation engine, second candidate loads for a second subnetwork of the plurality of subnetworks generated using the partition engine;

responsive to generating the first candidate loads using the first instance of the multiple instances of the load generation engine and responsive to generating the second candidate loads using the second instance of the multiple instances of the load generation engine, autonomously selecting, using a load picking engine, a set of candidate loads from among a combined pool of candidate loads generated using the multiple instances of the load generation engine, wherein the combined pool of candidate loads includes the first candidate loads and the second candidate loads;

splitting the set of candidate loads into subsets of candidate loads, wherein time windows of the subsets of candidate loads align with time ranges of a facility;

iteratively reducing, without integer constraints, the subsets of candidate loads into a number of candidate loads;

determining multiple candidate loads from the number of candidate loads that optimize an objective function with the integer constraints; and selecting at least one candidate load from the multiple candidate loads corresponding to a mode of transportation.

2. The system of claim 1, wherein splitting the set of candidate loads is based on facility capacity limits for the time ranges of the facility.

3. The system of claim 1, wherein iteratively reducing the subsets of candidate loads comprises:

determining, using column generation, the number of candidate loads that meet first time range criteria.

4. The system of claim 3, wherein the first time range criteria comprises multiple pickup or delivery day options.

5. The system of claim 1, wherein determining the multiple candidate loads comprises:

determining, using a mixed integer programming model, the multiple candidate loads based on second time range criteria.

6. The system of claim 5, wherein the second time range criteria comprises a first time window for each candidate load aligning with a second time window of available capacity of the facility.

7. The system of claim 6, wherein the mixed integer programming model is formulated to add the integer constraints back to the multiple candidate loads based on decision variables and input parameters.

8. The system of claim 7, wherein the decision variables comprise at least one of:

when a candidate load is selected;

when the candidate load is determined to arrive during a time period; or when a shipment is covered by the candidate load.

9. The system of claim 8, wherein the input parameters comprise:

a facility capacity during a time period of each day;

a volume capacity of the facility capacity consumed by the multiple candidate loads; or a set of candidate load arrival times of the multiple candidate loads at the facility.

10. The system of claim 9, wherein the integer constraints of the mixed integer programming model comprise at least one of:

selecting an arrival date when a load of the multiple candidate loads is selected;

facility capacity constraints during multiple time periods each day; or a minimum number of shipments covered by the multiple candidate loads.

11. A computer-implemented method comprising:

generating a plurality of subnetworks by partitioning an inbound network into the plurality of subnetworks;

triggering multiple instances, of a load generation engine, across parallel processors based on a number of the plurality of subnetworks;

generating, using a first instance of the multiple instances of the load generation engine, first candidate loads for a first subnetwork of the plurality of subnetworks;

generating, using a second instance of the multiple instances of the load generation engine and in parallel with generating the first candidate loads using the first instance of the multiple instances of the load generation engine, second candidate loads for a second subnetwork of the plurality of subnetworks;

responsive to generating the first candidate loads using the first instance of the multiple instances of the load generation engine and responsive to generating the second candidate loads using the second instance of the multiple instances of the load generation engine, autonomously selecting a set of candidate loads from among a combined pool of candidate loads generated using the multiple instances of the load generation engine, wherein the combined pool of candidate loads includes the first candidate loads and the second candidate loads;

splitting the set of candidate loads into subsets of candidate loads, wherein time windows of the subsets of candidate loads align with time ranges of a facility;

iteratively reducing, without integer constraints, the subsets of candidate loads into a number of candidate loads;

determining multiple candidate loads from the number of candidate loads that optimize an objective function with the integer constraints; and selecting at least one candidate load from the multiple candidate loads corresponding to a mode of transportation.

12. The computer-implemented method of claim 11, wherein splitting the set of candidate loads is based on facility capacity limits for the time ranges of the facility.

13. The computer-implemented method of claim 11, wherein iteratively reducing the subsets of candidate loads comprises:

determining, using column generation, the number of candidate loads that meet first time range criteria.

14. The computer-implemented method of claim 13, wherein the first time range criteria comprises multiple pickup or delivery day options.

15. The computer-implemented method of claim 11, wherein determining the multiple candidate loads comprises:

determining, using a mixed integer programming model, the multiple candidate loads based on second time range criteria.

16. The computer-implemented method of claim 15, wherein the second time range criteria comprises a first time window for each candidate load aligning with a second time window of available capacity of the facility.

17. The computer-implemented method of claim 16, wherein the mixed integer programming model is formulated to add the integer constraints back to the multiple candidate loads based on decision variables and input parameters.

18. The computer-implemented method of claim 17, wherein the decision variables comprise at least one of:

when a candidate load is selected;

when the candidate load is determined to arrive during a time period; or when a shipment is covered by the candidate load.

19. A non-transitory computer-readable medium storing computing instructions that, when executed on a processor, cause the processor to perform operations comprising:

identifying a plurality of subnetworks of a network partitioned into the plurality of subnetworks;

triggering multiple instances across parallel processors based on a number of the plurality of subnetworks;

generating, using a first instance of the multiple instances, first candidate loads for a first subnetwork of a plurality of subnetworks;

generating, using a second instance of the multiple instances and in parallel with generating the first candidate loads using the first instance of the multiple instances, second candidate loads for a second subnetwork of the plurality of subnetworks;

responsive to generating the first candidate loads using the first instance of the multiple instances and responsive to generating the second candidate loads using the second instance of the multiple instances, autonomously selecting a set of candidate loads from among a combined pool of candidate loads generated using the multiple instances, wherein the combined pool of candidate loads includes the first candidate loads and the second candidate loads;

splitting the set of candidate loads into subsets of candidate loads, wherein time windows of the subsets of candidate loads align with time ranges of a facility;

iteratively reducing, without integer constraints, the subsets of candidate loads into a number of candidate loads;

determining multiple candidate loads from the number of candidate loads that optimize an objective function with the integer constraints; and selecting at least one candidate load from the multiple candidate loads corresponding to a mode of transportation.

20. The non-transitory computer-readable medium of claim 19, wherein splitting the set of candidate loads is based on facility capacity limits for the time ranges of the facility.

* * * * *